(No Model.)

J. B. CLARKE.
LID FOR TEA OR COFFEE POTS.

No. 255,840. Patented Apr. 4, 1882.

Witnesses.
Josiah W. Ells
Chas Glenn

Inventor
John B. Clarke
Atty. O. D. Levis

UNITED STATES PATENT OFFICE.

JOHN B. CLARKE, OF PITTSBURG, PENNSYLVANIA.

LID FOR TEA OR COFFEE POTS.

SPECIFICATION forming part of Letters Patent No. 255,840, dated April 4, 1882.

Application filed August 31, 1881. (No model.)

*To all whom it may concern:*

Be it known that I, JOHN B. CLARKE, of the city of Pittsburg, in the county of Allegheny and State of Pennsylvania, have invented a new and Improved Lid for Tea or Coffee Pots, so constructed that the lid may be either raised or closed down and firmly held in that position without bringing the hand in direct contact therewith, whereby the contents of the pot may be poured out in such a manner as to avoid all slopping and consequent danger of scalding the hand by the sudden and unexpected opening of the lid.

To enable others to understand the exact nature of my invention, I will proceed to describe it by reference to the accompanying drawings, wherein—

Figure 1:
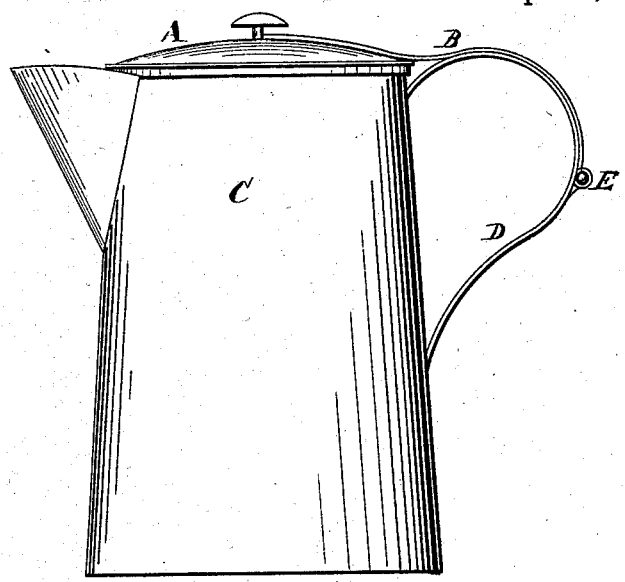
Figure 2:
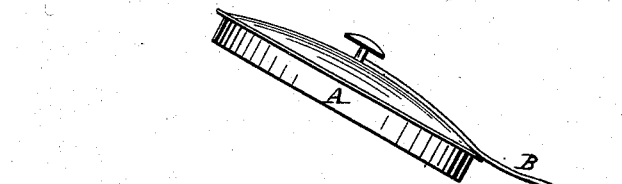
Figure 2:
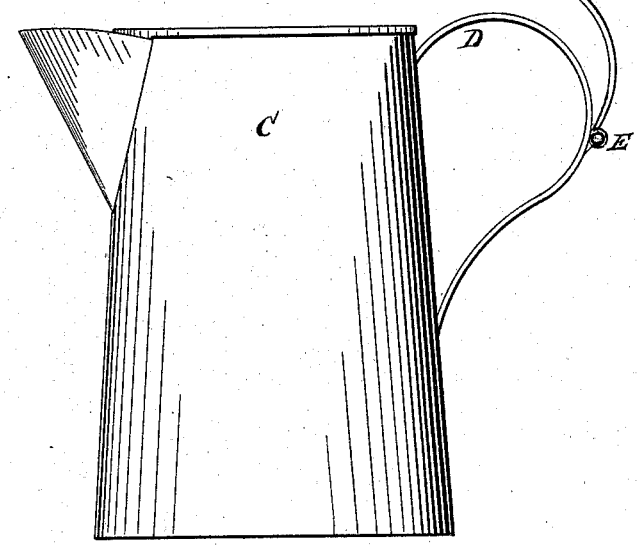

Figure 1 represents a side elevation of a coffee-pot with a closed lid provided with my means of attachment; Fig. 2, a similar view of the same pot, showing it with the lid in a raised position.

The tea or coffee pot to which I intend to apply my invention may be constructed of any suitable material and in any of the well-known forms, and provided with a handle, spout, and such lid as may be appropriate to such contrivances; but in order to accomplish the object of my invention I furnish the lid A with a rigid strap-like tail-piece, B, so formed as that when the lid is down, closing the mouth of the pot C, the strap, by reason of a corresponding degree of curvature, will coincide with and rest snugly upon the upper portion of the handle D and extend downward to a point opposite its greatest distance from the body of the pot C. At this point the extremity of the strap B is connected to the handle D by a hinged joint, E, permitting the lid to be raised by a simple upward pull on the tail-piece B, so as to open the pot after the manner shown in Fig. 2. On downward pressure being applied by the thumb the lid may be closed and held firmly in that position without inconvenience during the whole time the pouring out of the contents of the pot is going on. This in the case of coffee and tea pots is very desirable, as the lid is generally too hot to allow of its being held by the hand, and, as ordinarily attached, it often opens when not required and when least expected, scattering the hot contents of the pot around, slopping over the cups, and soiling the table-cloth, to say nothing of the danger of scalding one's self.

Having thus briefly described my invention, I claim—

The lid A, provided with a rigid tail-piece, B, constructed, as described, so as to curve around upon and extend down the back of the handle D to a point most remote from its connection with the body of the pot C, and hinged or pivoted to the handle in the manner shown, for the purposes set forth.

JOHN B. CLARKE.

Witnesses:
JOHN BURKE,
JOHN GRIPP.